United States Patent Office 2,945,471
Patented July 19, 1960

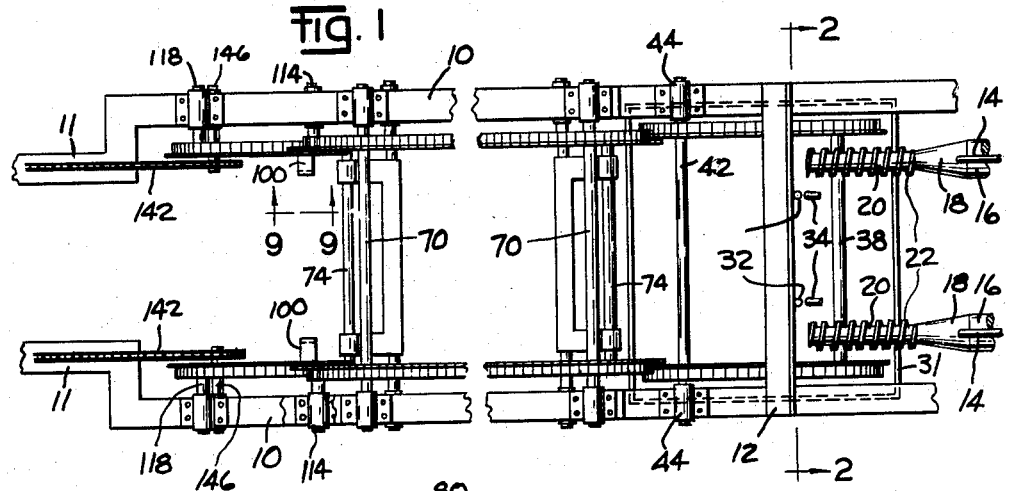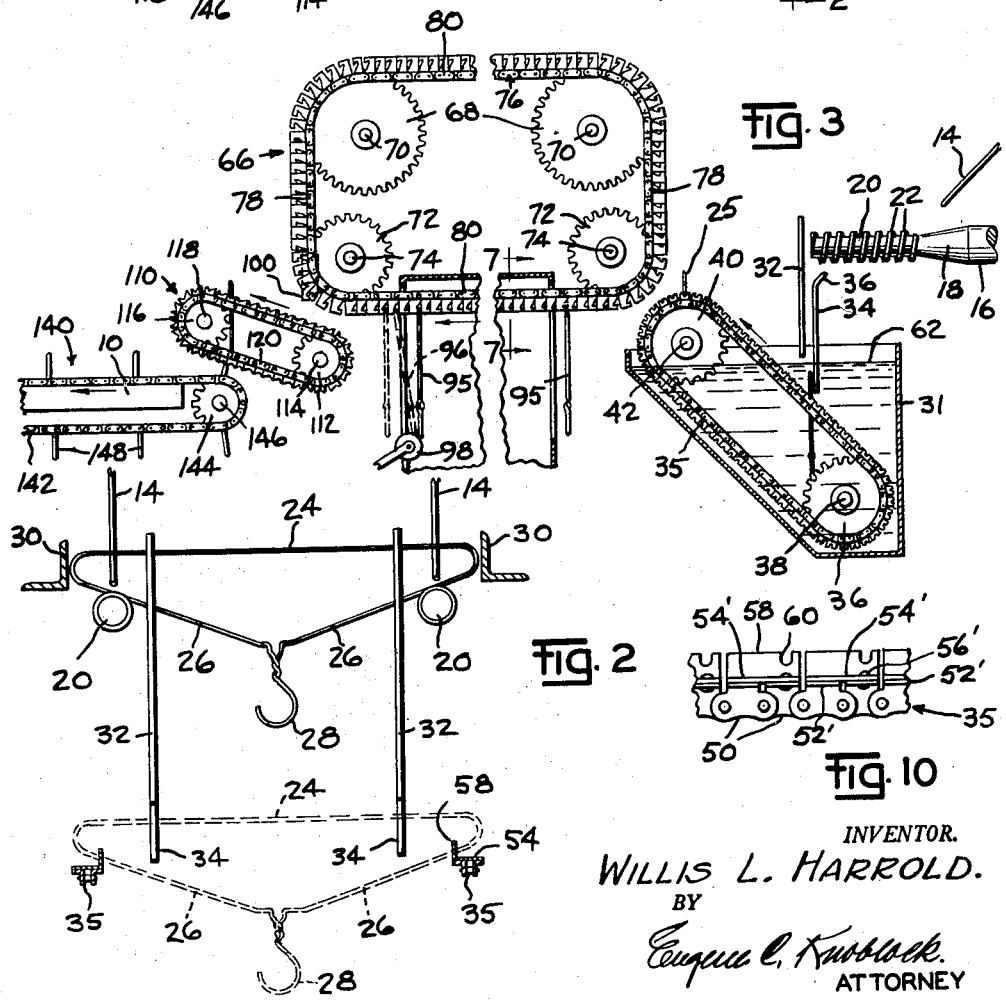

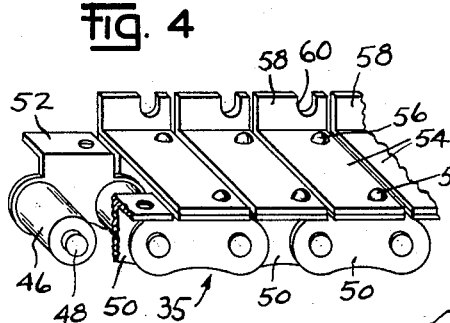
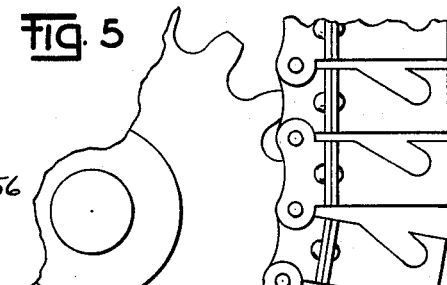
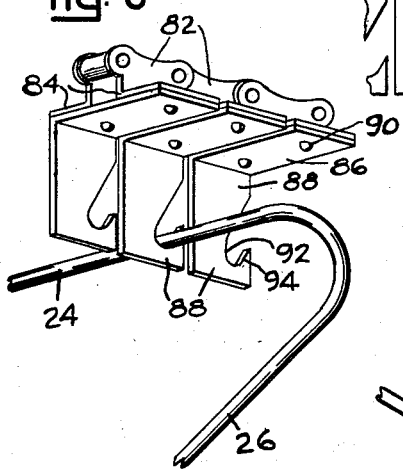
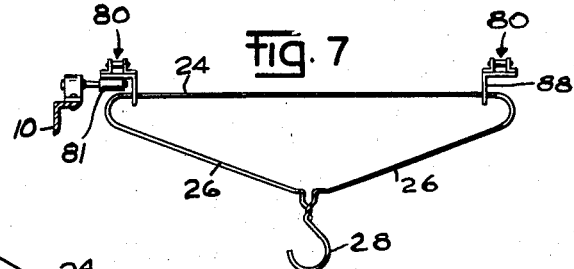
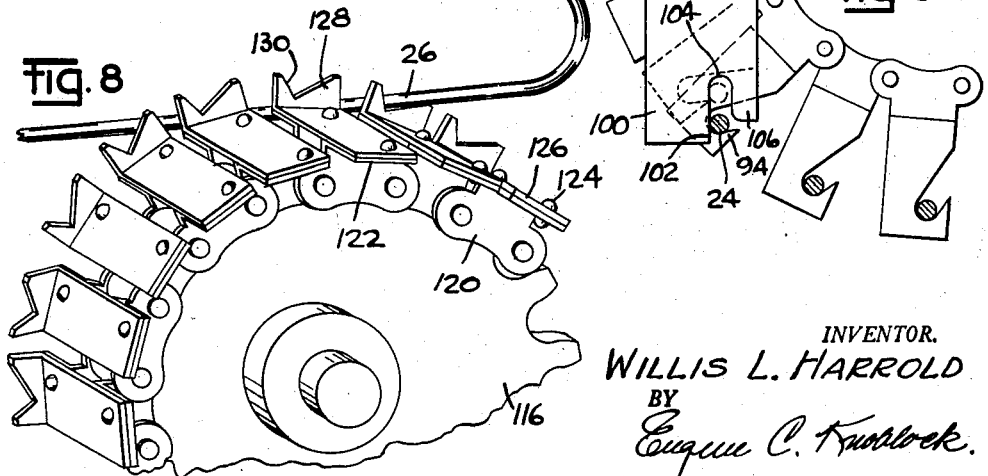

2,945,471

CONVEYOR AND COATING MECHANISM

Willis L. Harrold, 4305 Lincoln Way East,
Mishawaka, Ind.

Filed June 10, 1957, Ser. No. 664,662

5 Claims. (Cl. 118—58)

This invention relates to improvements in conveyor mechanisms. More particularly, the invention relates to a conveyor for transferring from station to station and through different work zones work pieces of flat and irregular outline while held in vertical position and with minimum surface contact with supporting means. One example of a device or article to be so conveyed in a coat hanger which is to be passed through stations or zones in which it is painted or otherwise surface coated and dried, and which is delivered to a packaging station, all without requiring manual handling or manipulation.

It is the primary object of this invention to provide a device of this character which will hold flat work pieces in a vertical plane in close spaced but non-contacting relation to one another while passing through various zones, and which will transfer such articles from one conveyor to another for successive treatment without requiring manual handling of the articles at any time in the process until they are discharged at a delivery point.

A further object is to provide a device of this character with a novel means for orienting a work piece in selected position and for supporting the same successively at different parts thereof spaced vertically from each other and in a manner to accommodate transfer of the article from one conveyor to a successive conveyor.

A further object is to provide a device of this character having a novel conveyor construction for supporting flat articles in upright position and at selected spacing to discharge the same at a predetermined delivery point in proper position to be picked up by a succeeding conveyor.

A further object is to provide a device of this character having conveyors, including a pair of chains having parallel runs, each mounting a plurality of clips for engaging a work piece in predetermined orientation to the chains.

A further object is to provide a device of this character wherein a conveyor has a pair of chains having parallel runs, each of said chains carrying elongated clips notched at one vertical edge thereof spaced from the chain, being so positioned that when adjacent clips are mounted on a straight run of the chain the hook notch is closed in each clip by an adjacent edge of the other clip, and wherein the clips project radially when passing around sprockets to space the hooks thereof and open the hook notches for reception of a work piece at one end of the conveyor and for discharge of the work piece at the opposite end of the conveyor.

A further object is to provide a device of this character wherein the conveyor has a pair of chains having parallel runs and adjacent chain links mount adjacent clips having portions projecting therefrom and notched to form sockets receiving edge portions of a work piece at opposite ends thereof to support the work piece between the chains in a substantially vertical plane and discharge the same at a selected position at an end of the conveyor.

A further object is to provide a device of this character having a pair of parallel helical rotary members supporting the lower edges of the opposite end portions of a work piece for advancing the same to a discharge position at the end of said helical members by a sidewise movement while the work piece is in a vertical plane and at which discharge position is located guide means for controlling the position of the work piece as it falls from the helical members onto a conveyor therebelow by which it is conveyed through a working zone.

Other objects will be apparent from the following specification.

In the drawings:

Fig. 1 is a fragmentary top plan view of the device;

Fig. 2 is a schematic transverse vertical view of the device taken on line 2—2 of Fig. 1;

Fig. 3 is a view in side elevation in partially schematic form of the device, with the frame and drive mechanism of the device omitted;

Fig. 4 is an enlarged fragmentary perspective view of a detail of one of the parts of the conveyor;

Fig. 5 is an enlarged detail side elevational view of another part of the conveyor;

Fig. 6 is a perspective view of a part of the conveyor illustrated in Fig. 5, and showing the portion of a work piece carried thereby;

Fig. 7 is a transverse view taken on line 7—7 of Fig. 3, illustrating the manner in which a work piece is supported by the conveyor parts illustrated in Figs. 5 and 6;

Fig. 8 is an enlarged perspective view of a detail of a conveyor located at another part of the device for receiving work members discharged from the conveyors illustrated in Figs. 5 and 6;

Fig. 9 is a fragmentary detail view taken on line 9—9 of Fig. 1, and illustrating transfer means for discharging a work piece from the conveyor section illustrated in Figs. 5 and 6; and Fig. 10 is a fragmentary side view of a modified form of the conveyor shown in Fig. 4.

The invention has been illustrated as applicable for the conveying and handling of flat articles, such as wire coat hangers. It will be understood that this use of the invention is illustrative and is not intended to be limiting. Thus the device is capable of use for handling articles of substantially flat shape which may be formed of wire or other material. Also it is not essential that the articles be of exactly flat shape, but they should be either of rigid or shape-retaining character and preferably should include portions adapted for engagement by suspension means or hooks. The device is capable of transferring such work pieces from one to another part of a multiple part conveyor unit, and particularly is capable of transferring a work piece from one part or conveyor to another in a controlled movement while positioning the work piece in a selected attitude, such as a vertical plane, and while holding adjacent work pieces out of contact with one another.

In the preferred embodiment of the invention, as herein illustrated, the device is provided with a frame or other support 10, shown schematically in Fig. 1, and which may be of any size, shape and construction found suitable. Side rails or opposite side parts of the frame may be interconnected by transverse frame members 12 and will be supported upon legs, pedestals or any other suitable means (not shown) which preferably will be so constructed and located as to leave the space between the opposite side members of the frame clear and unobstructed to accommodate passage of a work piece lengthwise of the frame in a predetermined path without interference from frame parts. The frame 10 will preferably be located adjacent the delivery station of a machine or conveyor by which the work pieces are supplied. Such a machine may constitute a forming or manufacturing machine (not shown) of any suitable character and which is provided with delivery means, such as inclined members 14, extending parallel to one another and spaced apart so as to provide runs on which the lower portions of opposite ends of the work piece may slide onto feed members 16. The feed members 16 preferably constitute parallel spaced substantially horizontal rotary shafts 16 having tapered or conical portions 18 below the discharge ends of the inclined members 14 to be engaged by the end portions of the work piece which slides thereon to an end portion 20 of each said shaft, which end portions are characterized by helical ribs 22 which advance the work piece resting thereon at a predetermined rate depending upon the lead of the helical rib 22.

In instances where the work pieces constitute wire coat hangers, the work pieces will be supported upon the members 16 in the inverted position illustrated in Fig. 2, with the cross bar or transverse portion 24 thereof uppermost, the converging shoulder portions or runs 26 engaging the members 20, and with the hook 28 positioned lowermost and constituting a stabilizing part therefor as suspended, so that the work member 24, 26, 28 will assume a vertical position. The frame 10 will preferably include or carry a pair of longitudinal guide members 30 located in outwardly spaced parallel relation to and at a level slightly above the members 20 so as to limit endwise displacement of the work pieces upon the members 20 and accommodate free movement of the work pieces relative to said guide members 30.

The members 20 extend above and terminate intermediate the length of a tank 31 which is open at its top and which is of a width greater than the spacing between the guides 30. The frame part 12 carries vertical guide parts 32 spaced from the end of the members 20 a distance greater than the thickness of the work piece. The guide members 32 preferably extend to a height above the level of the members 20 and preferably project to a level within tank 31 or adjacent to the top edge of the tank 31. A second vertical guide 34, or a plurality of such guides, extends parallel to the guide members 32 and spaced therefrom a distance greater than the thickness of the work member to guide the work member in cooperation with the member 32 after the same has been discharged from the feed member 20. The upper end portions 36 of the member or members 34 will preferably terminate below the level of the feed member 20 and will preferably be bent angularly as illustrated in Fig. 3 so as to guide the work member between the parts 32 and 34 if it should contact the member 34 out of true vertical position. The lower end of the member 34 will project into the container 31 below the level of the lower end of the guide 32, as illustrated in Fig. 3.

A conveyor unit operates within the tank 31, as illustrated in Fig. 3, and preferably constitutes a pair of endless chains 35 spaced apart a distance less than the length of the work piece 24 and each trained around a lower sprocket 36 mounted on a shaft 38 and around an upper sprocket 40 mounted on a shaft 42. Any suitable means (not shown) may be provided for journaling the shafts 38 and 42. The journal for the shaft 38 will be located within the tank 31 adjacent the bottom thereof and below feed member 20 and in such a position that guides 32 and 34 will be located intermediate the length of the upper runs of the chains 35 when trained around said sprockets. The shaft 42 may be journaled by bearings 44 carried by the frame 10 and may be connected to suitable means (not shown) for rotating the shaft 42 and consequently rotating the chain 35. The level of the shaft 42 will be at or adjacent the upper open end of the tank 31 so that the uppermost portion of the sprocket 40 will project above the level of the tank 31. The lower ends of the guides 34 will terminate at or adjacent the level of the adjacent portions of the chains 35 while the lower end of the guide 32 will terminate spaced above the adjacent portions of the chains sufficient for clearance between the lower end thereof and the uppermost part 24 of a work member carried by the chain.

The chains 35 will preferably be chains of the roller type having uniformly spaced rollers 46 rotating on pins 48 whose opposite ends are riveted to links 50. The links 50 preferably include perpendicularly projecting flanges 52, as illustrated in Fig. 4. The flanges 52 of the chain links provide means for support and attachment of the base plates 54 of clips extending transversely of the chain and anchored or secured to said flanges by rivets or other securing members 56. The clips have flanges 58 bent perpendicularly therefrom to extend lengthwise of the chain and said flanges are preferably notched at 60.

The clips preferably are so located that they are positioned at the outermost sides of the chains, that is, they are positioned at the upper sides of the upper runs and at the bottom sides of the lower runs of the chains. Thus the flanges 58 will be located uppermost on the upper runs of the chains which the work piece discharged into the container 31 engages after falling by gravity between the guides 32 and 34. Since the upper runs of the chains are inclined, the uppermost edges of the flanges 58 will be similarly inclined and the work piece will slide thereon to a position in contact with the rear or lowermost guide 34 to be held in substantially vertical position thereby until the succeeding notch 60 moves into a position to receive the work piece. Thereupon the work piece falls into the notches 60 of the clips of opposite chains 35 to assume upright inverted position and is carried upwardly thereby toward the lefthand upper end of the tank 31 in the direction of the arrow shown in Fig. 3. The work piece passes in a generally arcuate path of movement over the uppermost portion of the upper sprockets 40 above the level of the tank 31. The numeral 25 in Fig. 3 illustrates the uppermost position of the work piece, and it will be evident that as the sprockets 40 rotate in a counterclockwise direction as viewed, the work piece at 25 will be moved toward the left in a downward curved path while maintaining a vertical position. It will be understood that the tank 31 may contain paint or any other coating or treating material for the work piece to a level 62 which will permit complete immersion of the work piece as it is discharged by the guides 32 and 34.

The clips 54' may be employed upon the chain 35 as illustrated in Fig. 10, if desired. Such clips 54' are shown as having a dimension lengthwise of the chain substantially equal to the length of two of the chain links 50 and they are anchored at 56' to the flanges 52' of alternate chain links. The clips 54' will have the flanges 58 thereof notched at 60, as described above, and the notches 60 will preferably be substantially aligned with the securing members 56' which anchor the base of each clip 54 to the flange 52' adjacent one of the side edges of that clip base. Such construction constitutes means for spacing work pieces at a greater distance along the length of the chain than the construction described previously. It will be understood that the dimensions and proportions shown in Fig. 10 are illustrative and may be varied according to the needs of the particular use to which the device is put, and particularly according to the dimensions of the work piece. The anchorage of the clip 54' along one edge thereof in such construction is important from the standpoint that the clip is anchored only to one link, so that the flexing of adjacent chain links as the chains pass around the sprockets does not impose any stress upon the clip nor does the clip impose any limitation upon such flexing of the chain.

A conveyor unit 66 may be provided to receive work pieces delivered to a discharge point by the paint tank conveyor. The conveyor unit 66 includes upper sprockets 68 mounted by shafts 70 suitably journaled on the frame 10 about parallel axes at a level substantially above the level of the tank 31, and a lower set of sprockets 72 mounted on shafts 74 journaled on the frame. The sprockets 68 will preferably be of larger diameter than the sprockets 72 and the shafts 74 will be spaced apart a distance greater than the shafts 70 in order to arrange the parts substantially as illustrated in Fig. 3 in such a manner that chains 76 trained around said sprockets 68 and 72 will have substantially vertical runs 78 at opposite ends of the conveyor and upper and lower runs 80 which extend substantially horizontally. The conveyor unit 66 is so arranged that the level of the lower runs 80 thereof is adjacent to or only slightly above the uppermost point of the sprockets 40, and the vertical runs 78 of the chains thereof are preferably substantially aligned with or slightly overlap the furthermost point of travel of the chain 35 toward the left as viewed in Fig. 3. The adjacent sprockets 40 and 72 are spaced apart only to a slight distance, which distance depends upon the dimensions of the work piece, as will be mentioned hereafter. Suitable means, such as idler rollers 81, may support the lower runs 80 of the chains 76.

The chains 76 will preferably be roller chains whose side links 82 are provided with perpendicular flanges 84. Clips of substantially L-form and characterized by elongated perpendicularly outwardly projecting parts or hook members 88 and by bases 86 are secured to the flanges 84 at said bases by rivets or other securing means 90. The hook members 88 are preferably plate portions or flanges having substantially parallel side edges and each has a notch or recess 92 extending at an angle to a side edge thereof in such a manner as to provide a hook, lip or tongue 94 which extends in the direction of the clip base 86 from a point adjacent the free outer end of the part 88. The arrangement is such that the hook tips 94 will project upwardly when the chain parts which mount them are in the lower run 80 of the chain, and will be positioned uppermost when the chain parts which carry them are located in the vertical run 78 adjacent to the sprocket 40, all as illustrated in Fig. 5.

The conveyor 66 is so oriented to the discharge end of the tank conveyor that the work pieces mounted by brackets 58 of the tank conveyor are successively moved counterclockwise from position 25 in Fig. 3 toward the hooks 88 passing clockwise around the lower righthand sprockets 72. In other words, where coat hangers are being conveyed by the clips 54, 58, as illustrated in dotted lines in Fig. 2, with the angularly disposed shoulder portions 26 thereof resting upon the clip parts 58 and the cross bar 24 of the hanger spaced upwardly above the level of the clips 58, the tank conveyor will shift the work pieces from the position 25 in Fig. 3 to a position at which the cross bar 24 of the coat hanger is brought into contact with inclined hook portions 88 positioned radially of the adjacent sprockets 72 spaced from adjacent hooks, as illustrated in Fig. 5. Thus the cross bar 24 of the work piece is free to pass between adjacent hooks 88 and to engage a hook slot or notch 92 to be confined therein by the hook lip 94. Observe that the parts are so oriented that the work piece is moving downwardly rapidly at the time that it engages the hooks 88, and, therefore, its engagement in the hook slots 92 of said hooks permits it to be freed or lifted from the brackets 54, 58 and carried along with the chains 76 which have their lower runs moving in the direction of the arrow in Fig. 3, away from the tank 31. It will be observed that the hooks 88 are positioned close to each other when the part of the chain which carries them is straight, thereby substantially closing the hook notches 92, as illustrated in Fig. 6, particularly in cases where the thickness of the work piece 24, such as a wire, is greater than the spacing between the adjacent hooks 88.

The conveyor unit 66 is preferably used for carrying work pieces through a heating chamber, such as a paint-drying oven (not shown). The length of the unit 66 will be sufficient to insure the drying of the coating which adheres to the work pieces at the tank 31. The work pieces will be freely suspended from the hooks 88 as illustrated at 95 in Fig. 3. Inasmuch as the parts of the work piece which are engaged by the hooks 88 are covered with paint and the function of the carrier unit 66 is to permit that paint to dry, there is risk that the drying of the paint will produce an adhesion of the work piece with the hooks which carry it. Therefore, some means are desirable to insure that such adhesion is broken before the conveyor carries the work piece to the discharge point, and preferably shortly before it reaches the discharge point and after the drying operation has been substantially completed. Inasmuch as the work pieces are being suspended from the hooks, as illustrated in Fig. 3, a simple rocking of the work piece to a slight extent will accomplish the desired action, and particularly a rocking to the position shown in dotted lines at 96 in Fig. 3 is ample. Such rocking action may be accomplished by mounting a roller or other part 98 in the path of the lowermost position of the work part.

The discharge of a work piece from the conveyor unit 66 may be accomplished in the manner illustrated in Fig. 9. Thus as the hooks 88 travel around the lower lefthand sprockets 72 shown in Fig. 3, they again move from parallel positions to radial positions relatively angularly to one another and spaced apart as illustrated in Fig. 9. Incident to this movement of the hooks around the lower lefthand sprockets 72 the hooks will be tilted to position their slots or notches 92 lowermost. When the hooks 88 reach a point approximately 45 degrees displaced from the vertical position so that the angular slots 92 are nearly horizontal, the cross bar 24 of the work piece engages an abutment 100 fixed in the device at an edge 102 thereof. Edge 102 is preferably positioned substantially vertically and may define one edge of a slot 104 extending vertically in the member. The leg 106 may define the other edge of the slot 104 and is shorter than the member 100 to permit the crossbar 24 to travel therebelow as it approaches the abutment edge 102. By this arrangement the edge 102 limits movement of the work piece with the hooks carrying it, as illustrated in Fig. 9, so that continued movement of the hooks which carry the work piece moves the cross bar 24 of the work piece in the slots 104 and toward the tips of the hook parts 94 for ultimate disengagement of the cross bar 24 from the hooks at a position illustrated in dotted lines in Fig. 9. The slot 104 will be of a width greater than the thickness of the cross bar 24 so that upon disengagement of the cross bar 24 from the hook parts 94, the work piece is free to drop by gravity. This action will occur just prior to the movement of the succeeding hooks 88 to positions below and intersecting the plane of the slot 104. It will be understood that the use of the slot 104 in the part 100, while preferred, is not essential, and that the tongue 106 of the part 100 may be omitted, if desired. The use of the tongue 106 is preferred, however, by reason of the fact that it assists in stabilizing the position of the work piece at the instant of discharge thereof.

The carrier unit 66 will preferably discharge onto another conveyor unit, such as the unit 110. The unit 110 preferably includes sprockets 112 mounted upon stud shafts 114 journaled in bearings carried by the frame 10, and sprockets 116 mounted on stud shafts 118 journaled in bearings carried by the frame 10. The sprockets 112 will be positioned substantially in vertical alignment with and spaced below the sprockets 72 at the discharge end of the unit 66 and at approximately the same spacing as sprockets 72. Chains 120 are trained around the sprockets 112 and 116 and, if desired, the shafts 114 and 118 may be at different levels so that the upper and lower runs of the chains are inclined as shown in Fig. 3. The spacing of the chains 120 will be less than the length of the work piece so that, as the work piece falls from the discharge station of the conveyor unit 66, as illustrated in Fig. 9, the end portions of the shoulder runs 26 of the coat hangers, or of the lowermost run or part of any other work piece, will engage the chains or parts carried thereby.

The chains 120 are preferably roller chains whose links carry perpendicular flanges 122 to which are secured by rivets or other securing members 124 the base portions 126 of work carrying clips. The clips preferably include flanges 128 perpendicular to the base portions 126 and provided with V notches 130 in their free end edges. The V notches 130 are defined by edge portions which preferably extend at a substantial angle to each other, for example, displaced in the order of 90 degrees or more, so as to avoid wedging or binding action of work pieces therein. Also, the gradual slope of the edges of the V notches 130 permits the notches to extend substantially full length of the clip 128. This avoids the necessity for precision adjustment of the parts in that the work piece will slide to the bottom of the notches 130 regardless of where it strikes the top edge of stop flanges 128 after release from the conveyor unit 66. The use of stud shafts 114 and 118 frees the space between the opposite chains 120 to avoid interference with free suspension of the work pieces between the chains and at the same time permits sprockets of small diameter, thus reducing the size of the conveyor unit 110 to a minimum.

In cases where the items being conveyed by the device are to be packaged in groups, the mechanism may include a final delivery and grouping conveyor unit 140 onto which the work pieces are discharged from the conveyor unit 110. The unit 140 preferably includes a pair of chains 142 whose upper runs traverse the portions 11 of the frame 10 to be supported thereby. The chains are trained around sprockets 144 which are carried by stud shafts 146 journaled in bearings supported by the frame 10. At spaced points along the length thereof, the chains 142 carry dividers 148. The spacing of dividers 148 will be correlated to the speed at which the chains 142 are driven so as to insure that a selected number of work pieces will be grouped on the chains 142 between adjacent dividers 148. Of course, this grouping or counting requires correlation of the rate of delivery of the feed mechanism with which the feed part 14 is associated, the speed of rotation of the feed screws 20, the speed of travel of the chains 35 of the conveyor unit in the coating tank 31, and the speed of travel of the conveyor units 66 and 110. When speed is so properly correlated, the work pieces grouped between adjacent divider members 148 of the unit 140 will constitute a predetermined number, and the group can be removed from the end of the conveyor by an operator and packaged without need for counting thereof.

It will be apparent from the foregoing specification that this mechanism makes possible the handling automatically of items of irregular shape, such as coat hangers, while they are treated, as through successive treatment steps, such as the steps of coating and drying and counting, so that no handling thereof is necessary between the feed point 14 and the discharge point of the apparatus. The mechanism entails transfer of work pieces successively from one conveyor unit to another and the positioning of the parts on each unit properly for the treatment to which the work pieces are to be subjected while supported by each unit. In particular, the mechanism enables the transfer of a work piece from one conveyor unit supporting the work piece at one part thereof to another conveyor unit supporting the work piece at a different part thereof and in a different orientation. Thus selected parts of the work pieces may bear upon the parts of one conveyor unit for one phase of the treatment of the work piece, as upon the clips 54, 58 carried by the chains 35 during immersion of the workpiece in a paint tank, and the work piece may be suspended at a different part thereof from the hooks 88 of another conveyor unit, as to facilitate draining of excess coating material from the work pieces in connection with the drying of the work pieces. Support of the work pieces at the conveyor units 110 and 140 again entails bearing of the lowermost part of the work piece upon the conveyor units.

While the preferred embodiment of the invention has been illustrated and described, it will be understood that changes in the construction may be made within the scope of the appended claims without departing from the spirit of the invention.

I claim:

1. In combination, a conveyor unit including a pair of spaced similar endless work carriers each having an upper work supporting run and a downwardly curved delivery portion, means for delivering work pieces to the upper runs of said carriers, said work supporting runs being parallel and side by side, clips uniformly close spaced on said carriers to receive and support opposite ends of the lower portion of a rigid elongated work piece spanning said carriers and having an upper bar part so that the upper bar part is positioned above the upper runs of the carriers, a second conveyor including a pair of spaced similar endless work carriers positioned side by side and each having a lower work supporting run and an approach run angular to and above said supporting runs, and a plurality of hook members mounted on and projecting outwardly from said carriers in close spaced relation at said lower supporting runs to support the upper bars of said work pieces against release, said second carriers extending adjacent to and above the discharge end of said first carriers at a curved part thereof between said approach runs and lower runs at which said hooks extend at an angle to each other and spaced apart, said hook members intercepting and hooking the upper bars of said work pieces at the downwardly curved delivery portion of said first conveyor.

2. The combination defined in claim 1 wherein said hooks constitute plate portions advanced edgewise by said endless carriers and each having a diagonal slot therein open at the trailing edge thereof and extending forwardly and downwardly when said plates are at said lower work-supporting run.

3. In combination, a conveyor unit including a pair of spaced similar endless work carriers each having an upper work-supporting run and a downwardly curved delivery portion, means for positioning the opposite ends of rigid work pieces in selected close spaced position on and spanning the upper runs of said carriers with an upper elongated parts of each work piece spaced above the upper runs of said carriers, a second conveyor unit including a pair of similar spaced endless work carriers, a plurality of hook members mounted on and projecting outwardly from said last named carriers, said second conveyor unit having a lower substantially horizontal and substantially straight work-supporting run and a substantially upright and substantially straight run at both of which said hook members are closely spaced, said runs merging at a curved conveyor portion adjacent to and above the discharge end of the upper run of said first conveyor and intercepting said upper work piece parts at the delivery portion of said first conveyor unit, said hooks being open at their trailing edges and spaced apart at said curved conveyor portion, and means for advancing said conveyors in timed relation whereby said first conveyor delivers the upper parts of said work pieces between said hooks and transfers the same to said hooks.

4. A device for conveying wire coat hangers having a hook portion, shoulder runs diverging angularly from said hook and a cross-bar connecting said shoulder runs, comprising a tank containing coating material, a conveyor unit including similar endless carrier members having spaced parallel upper work-carrying inclined runs each having a portion immersed in said tank and a downward discharge portion projecting above said tank, close spaced means on each carrier for supporting said hangers within said tank in inverted position with the ends of said shoulder runs bearing on said supporting means, a second conveyor unit including spaced similar endless carriers having parallel lower runs located side by side and a curved pick-up portion, and a plurality of suspension hooks mounted on each of said second carriers and open at their trailing portions, said second unit successively advancing said hooks to said pick-up portion adjacent and above the curved discharge end of said first unit, and means for driving said conveyors in timed relation, the spacing of said hooks increasing at said pick-up portion, said first conveyor delivering cross-bars to said hooks through said increased spaces.

5. A device for conveying wire coat hangers having a hook portion, shoulder runs diverging angularly from said hook and a cross-bar connecting said shoulder runs, comprising a tank containing coating material, a conveyor unit including similar endless carrier members having spaced parallel inclined runs each having a portion immersed in said tank and a downturned discharge portion projecting above said tank, means on said carrier members for supporting said hangers in said tank in inverted position resting on the ends of said shoulder runs, a drying chamber adjacent said tank, a second conveyor unit extending through said chamber and including spaced similar endless carriers having parallel lower runs above the level of the discharge end of said first conveyor unit and downwardly extending runs vertically aligned with the discharge portion of said first conveyor, the carriers of said second unit mounting hooks, said second unit including a curved portion positioned spaced above the discharge end of said first conveyor unit and from which said hooks project divergently in the path of travel of the cross-bars of hangers at the downturned discharge portion of said first conveyor to pick up said cross bars.

References Cited in the file of this patent

UNITED STATES PATENTS

| | | |
|---|---|---|
| 849,122 | George | Apr. 2, 1907 |
| 890,250 | Thompson | June 9, 1908 |
| 990,246 | Fetterman | Apr. 25, 1911 |
| 1,512,331 | Funck | Oct. 21, 1924 |
| 1,676,911 | McDavitt | July 10, 1928 |
| 1,935,087 | Free | Nov. 14, 1933 |
| 2,244,236 | Bardet et al. | June 3, 1941 |
| 2,254,291 | Joa | Sept. 2, 1941 |
| 2,375,173 | Bunting et al. | Mar. 1, 1945 |
| 2,611,472 | Perky | Sept. 23, 1952 |
| 2,649,055 | Borrelli | Aug. 18, 1953 |
| 2,700,368 | Woodell et al. | Jan. 25, 1955 |
| 2,785,787 | Leavens | Mar. 19, 1957 |